United States Patent [19]

Swigert

[11] 4,343,008

[45] Aug. 3, 1982

[54] METHOD FOR CREATING MAGNETIC MASTERS

[75] Inventor: J. Kirk Swigert, Penfield, N.Y.

[73] Assignee: Xerox Corporation, Stamford, Conn.

[21] Appl. No.: 172,588

[22] Filed: Jul. 28, 1980

[51] Int. Cl.³ .......... G11B 5/00

[52] U.S. Cl. .......... 346/74.2; 346/153.1; 346/159; 430/39

[58] Field of Search .......... 346/74.2–74.7, 346/153.1, 159; 358/300; 430/98, 97, 39, 124, 122

[56] References Cited

U.S. PATENT DOCUMENTS

| | | | |
|---|---|---|---|
| 3,804,511 | 4/1974 | Rait et al. | 346/74.2 X |
| 3,823,405 | 7/1974 | Andreaggi et al. | 346/74.2 X |
| 3,845,306 | 10/1974 | Kohlmannsperger | 430/39 |
| 4,216,282 | 8/1980 | Edwards et al. | 346/74.2 X |

*Primary Examiner*—John H. Wolff

*Attorney, Agent, or Firm*—Eugene O. Palazzo; Peter H. Kondo; John E. Beck

[57] ABSTRACT

A magnetic master is provided by premagnetizing a magnetizable recording member, forming characters on the backing layer of the recording member with a typewriter or suitable marking means, and exposing the recording member from the backing layer side to flash energy to demagnetize the background areas and form a latent magnetic image. The latent magnetic image may be contacted with a magnetic toner and the developed image transferred to a receiving surface where it is permanently fixed. The magnetic master may be developed hundreds or thousands of times to produce the desired number of prints.

6 Claims, No Drawings

METHOD FOR CREATING MAGNETIC MASTERS

This invention relates to magnetic imaging, and more particularly, to a method for creating a magnetic master imaging member, and its use.

It is known that a magnetic imaging system which employs a latent magnetic image on a magnetizable recording medium can then be utilized for purposes such as electronic transmission or in a duplicating process by repetitive toning or transfer of the developed image. Such latent magnetic image is provided by any suitable magnetization procedure whereby a magnetizable layer of marking material is magnetized and such magnetism transferred imagewise to the magnetic substrate. Such a process is more fully described in U.S. Pat. No. 3,804,511 to Rait et al.

As is disclosed in that patent, an optical image can be reproduced by first reducing it to a graphical image but employing a magnetizable marking material. Such magnetizable material is typiclly electroscopic toner comprising a ferromagnetic material which, after image formation, is susceptible to magnetization. There is thus formed an imagewise pattern of magnetization which pattern is then transferred to a magnetic substrate by any one of several methods as disclosed in the patent. Preferably, the magnetization in imagewise pattern is produced in a magnetic substrate by the anhysteretic method whereby the magnetized graphic image is brought into intimate contact with a magnetic substrate and while in contact is subjected to an A.C. signal from a recording head. The magnetic substrate is thereby magnetized in image configuration in accordance with the graphic image. Other methods of utilizing the magnetized graphic image for producing a latent magnetic image are also disclosed such as by providing intimate contact between the graphic magnetic material and a previously uniformly magnetized substrate and applying an erase signal through the graphic image support thereby applying the magnetic image as a shunt for the erase signal. There is thus produced by selective erasure in background areas a latent magnetic image in those areas shunted by the magnetic graphic image. Various other methods of providing such latent image utilizing a previously formed magnetizable graphic image are disclosed in the patent referred to above.

After formation, the latent magnetic image may be developed, that is, made visible by contact with magnetic marking material such as a toner composition. Subsequent to development of the latent magnetic image, it is usually desirable to transfer the toner image from the magnetic imaging member to a permanent substrate such as paper.

As disclosed in U.S. Pat. No. 3,845,306, it is also known to produce a magnetic image of an original by applying to a uniformly premagnetized surface a thermal image wherein the temperature of certain portions exceeds the Curie point. Such magnetic images can be converted into powder images by utilizing a magnetic toner. It is further known to subject a layer of magnetizable toner to the action of an external magnetic field and to simultaneously expose onto the magnetizable toner a thermal image wherein the temperature of certain portions exceeds the Curie point. This brings about a selective removal or transfer of pulverulent toner so that the residual toner or the removed toner forms a powder image. It was also proposed to bring a magnetic layer in contact with a control layer wherein certain portions are heated above the Curie point to thus provide on the magnetic layer a permanent magnetic image of the original. A drawback of all such conventional proposals is that the image receiving layer must be subjected to the action of an external magnetic field either prior to or during the application of thermal images.

In addition, there is no known method for employing a reflected image of an opaque original image to directly create a useful latent image magnetization pattern on a magnetic recording member having a continuous magnetic stratum. Consequently, latent image forming schemes couple processes which are sensitive enough to refection optics input with systems capable of forming a strong magnetization pattern. One latent image forming method is known as thermoremanent magnetization imaging which basically is a way to convert ferromagnetism in a magnetic layer to paramagnetism as the magnetic layer's temperature is raised to its Curie point ($T_c$). A thermal pattern created by light adsorbed in the magnetic layer through a contact mask must raise the background temperature ($T_b$) above $T_c$ while keeping the rest below $T_b$. Either a positive or negative image of the mask can be created depending upon whether one starts with a pre-recorded layer and erases in background areas (positive) or starts with an unrecorded layer and magnetizes.

Thus, the main object of the present invention is to provide a method of creating a magnetic imaging master via positive thermoremanent magnetization using a pre-recorded magnetic imaging member.

Another object of this invention is to provide a method for making latent magnetic images of originals on magnetic imaging surfaces and for converting such latent images into powder images.

Another object of the invention is to provide a thermomagnetic imaging method which employs a magnetic developer and wherein the image receiving surface need not be subjected to the action of external magnetic fields.

An additional object of the invention is to provide an imaging member wherein a magnetic latent image formed thereon can be converted into a powder image as often as desired or necessary.

These and other objects of this invention will be apparent from a reading of the following description of the invention.

In accordance with the present invention, there is provided a novel magnetic imaging member and a method for preparing the imaging member. The imaging member is obtained by premagnetizing a base, web, or tape structure containing a magnetizable material such as a magnetic tape having a magnetic recording surface. Premagnetizing of the magnetic recording member is performed using a spatial magnetization wavelength of between about 20 microns and about 120 microns, but preferably of about 70 microns. The magnetized recording member is then inserted in a typewriter having a conventional typewriter ribbon and a character image is typed on the backing layer of the recording member creating a right reading image on the backing layer. The magnetized recording member is then exposed from the backing layer side to flash energy to demagnetize the background areas. The flash energy source is typically a Xenon ® flash lamp having a flash energy of at least about $2.6\times10^6$ ergs/cm$^2$ and may vary depending upon the magnetization wavelength which is used to magnetize the magnetic recording member. In addition, the flash energy required to demagnetize the background areas may vary depending upon the magnetic component of the recording member. After exposure, the magnetic recording member is provided with a magnetic latent image in character shapes. That is, a magnetization pattern remains in the magnetic recording member where it has been masked by the typewriter ink characters. The magnetic latent image is then developed by contacting it with a magnetic toner composition in accordance with conventional means. The developed image is then transferred to a receiving surface such as paper by pressure contact therewith or by electrostatic means. The magnetographic master may be developed hundreds and perhaps thousands of times to produce the desired number of prints thus allowing a convenient way of producing multi-copies from the magnetic imaging master. It has been found that the typewritten image from the typewriter ribbon ink has the proper transmission density characteristics which allows erasure in the non-image or background areas of the magnetic recording member while simultaneously is able to withstand the heat generated in its most absorbing areas.

Thus, any suitable magnetic recording member which has a transparent substrate and contains a magnetizable material which becomes paramagnetic due to exposure energy may be employed in this invention. Overcoated and metallized magnetic recording members can also be employed in this invention. For example, an overcoating of an electroconductive material such as aluminum, copper, nickel, cobalt, magnesium, tin, zinc, chromium, gold, silver and mixtures or alloys thereof may be employed on the surface of the recording member. In addition, the electroconductive overcoating may be selected from carbon layers, carbon filled polymer films, and electroconductive polymer films. However, the preferred recording member comprises a magnetic tape having a chromium dioxide recording surface sold under the tradename Crolyn ® by E. I. duPont Company, Wilmington, Del., because excellent results have been obtained therewith.

In addition, besides using typewriter ribbon ink to form images on the backing layer of the recording member, images can be made from marking pens of various colors provided sufficient exposure energy is absorbed thereby. Further, marking fluids containing dyestuffs as well as pigmented inks can be used to mark the receiving member backing layer. Still further, erasure of such marks and remagnetization of the recording member is also possible provided no physical or chemical damage to the recording member has occurred.

In operation, a magnetizable recording member is magnetized, a character image is formed on the backing layer of the recording member, the recording member is exposed to flash energy creating a latent magnetic image, the latent magnetic image is developed, and the developed image is transferred to a receiving surface where it is permanently fixed. As earlier indicated, development of the latent magnetic image is accomplished by contacting it with a toner composition comprising a fusible resinous component and a magnetically attractable component. The magnetically attractable component may be present in the toner in the amount of about 20% by weight to about 90% by weight, based on the weight of the toner. The developed image is then contacted with a receiving member to which pressure may be applied and the image thereby transferred thereto. After transfer of the image to the receiving member, the image is fixed thereto. Any fixing method can be employed. Typical suitable fixing methods include heating the toner in the developed image to cause the resins thereof to at least partially melt and become adhered to the receiving member, the application of pressure to the toner optionally accomplished with heating such as the use of a heated roller, solvent or solvent vapor to at least partially dissolve the resin component of the toner, or any combination of the above. The receiving member is typically sufficiently hard to allow fixing solely by the application of pressure such as, for example, by a contact roller in an amount sufficient to calender the toner. These techniques are conventional in the art of fixing of toner and need not be elaborated upon herein.

Any suitable development technique can be employed for the development of the magnetic latent image residing on the recording member. Typical suitable development methods include cascade development, powder cloud development, and liquid development. It will be appreciated, of course, that if electrostatic transfer techniques are employed, the toner utilized at the development station contains an electrostatically attractable component.

Any suitable magnetizable toner composition may be employed in the imaging method of this invention. Typical magnetizable toner compositions include an electrostatically attractable component such as gum copal, gum sandarac, cumarone-indene resin, asphaltum, gilsonite, phenolformaldehyde resins, resin-modified phenolformaldehyde resins, methacrylic resins, polystyrene resins, epoxy resins, polyester resins, polyethylene resins, vinyl chloride resins, and copolymers or mixtures thereof. However, it is preferred that the electrostatically attractable component be selected from polyhexamethylene sebacate and polyamide resins. Among the patents describing toner compositions are U.S. Pat. No. 2,659,670 issued to Copley; U.S. Pat. No. 2,753,308 issued to Landrigan; U.S. Pat. No. 3,070,342 issued to Insalaco; U.S. Pat. No. Re. 25,136 to Carlson, and U.S. Pat. No. 2,782,288 issued to Rheinfrank et al. These toners generally have an average particle diameter in the range substantially 5 to 30 microns.

Any suitable pigment or dye may be employed as the colorant for the toner particles. Colorants for toners are well known and are, for example, carbon black, nigrosine dye, aniline blue, Calco Oil Blue, chrome yellow, ultramarine blue, Quinoline Yellow, methylene blue chloride, Monastral Blue, Malachite Green Oxalate, lampblack, Rose Bengal, Monastral Red, Sudan Black BN, and mixtures thereof. The pigment or dye should be present in the toner in a sufficient quantity to render it highly colored so that it will form a clearly visible image on a recording member.

Any suitable magnetic or magnetizable substance may be employed as the magnetically attractable component for the toner particles. Typical magnetically attractable materials include metals such as iron, nickel, cobalt, ferrites containing nickel, zinc, cadmium, barium, and manganese; metal oxides such as $F_2O_3$ and $Fe_3O_4$ or magnetite and hematite; metal alloys such as nickel-iron, nickel-cobalt-iron, aluminum-nickel-cobalt, copper-nickel-cobalt, and cobalt-platinum-manganese. Preferred for the instant process are magnetite and iron particles as they are black in color, low cost and provide excellent magnetic properties. The magnetic component particles may be of any shape and any size which results in magnetic toner particles having uniform properties. Generally, the magnetic component particles may range in size from about 0.02 micron to about 1 micron. A preferred average particle size for the magnetic component particles is from about 0.1 to about 0.5 micron average diameter.

In summary, it has been found that a magnetic imaging master may be prepared by premagnetizing a magnetizable recording member, forming characters or indicia on the backing layer thereof by suitable means such as a typewriter, and exposing the entire recording member from the backing side to flash energy to demagnetize the background areas forming a latent magnetic image. Another advantage of this invention is that the image is visible on the recording member and may be examined before it is converted to a latent image.

Although specific materials and conditions are set forth in the foregoing disclosure, these are merely intended as illustrations of the present invention. Various other suitable resins, magnetizable materials, magnetic substances, additives, pigments, colorants, and/or other components may be substituted for those above with similar results. Other materials may also be added to the recording member to sensitize, synergize or otherwise improve the imaging properties or other properties of the system.

Other modifications of the present invention will occur to those skilled in the art upon a reading of the present diclosure. These are intended to be included within the scope of this invention.

I claim:

1. A method of magnetic imaging which comprises, (1) providing a magnetic master which is prepared by premagnitizing a magnetizable recording member at a spatial magnetization wavelength of between about 20 microns and about 120 microns, (2) causing characters to be formed on the backing layer of the recording member with suitable marking means, (3) exposing the backing layer of the recording member to a flash energy source having an energy of at least about $2.6\times10^6$ ergs/cm$^2$, wherein background areas on the backing layer are de-magnetized thereby resulting in the formation of a latent magnetic image on the recording member, (4) contacting the latent magnetic image with a magnetic toner causing development thereof, (5) followed by transferring the developed image to a receiving surface, and subsequently repeatedly developing the magnetic latent image contained on the recording member, resulting in the production of numerous developed images, wherein the recording member is comprised of a transparent substrate containing a magnetizable material therein, which becomes paramagnetic upon exposure to said flash energy source.

2. A method in accordance with claim 1 wherein the recording member comprises a magnetic tape containing a chromium dioxide recording surface.

3. A method of imaging in accordance with claim 1 wherein the receiving surface is paper.

4. The method of claim 1 wherein said marking means comprises a typewriter.

5. The method of claim 1 wherein said magnetic toner comprises a fusible resinous component and a magnetically attractable component.

6. The method of claim 1 including permanently fixing said developed image to said receiving surface.

* * * * *